J. H. BRADY.
CHEWING GUM CHIP FORMING MACHINE.
APPLICATION FILED JULY 26, 1909.
966,160.
Patented Aug. 2, 1910.
3 SHEETS—SHEET 1.
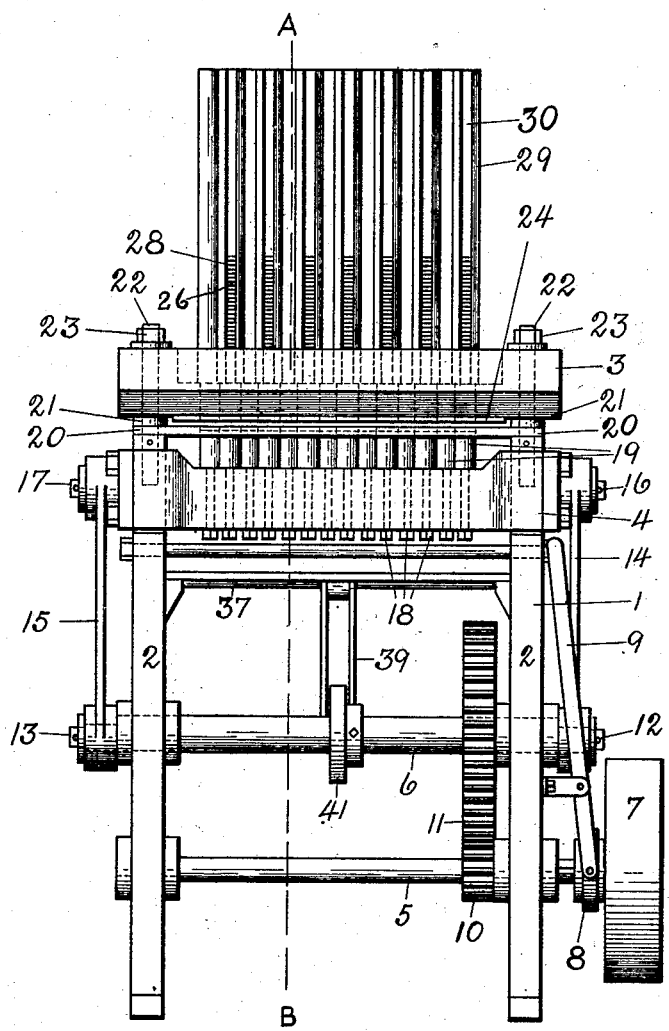
Fig-1-
WITNESSES:
John E. Heller.
Mamie Norton
INVENTOR.
J. Henry Brady,
BY Abraham Knobel,
ATTORNEY.

J. H. BRADY.
CHEWING GUM CHIP FORMING MACHINE.
APPLICATION FILED JULY 26, 1909.
966,160.
Patented Aug. 2, 1910.
3 SHEETS—SHEET 2.
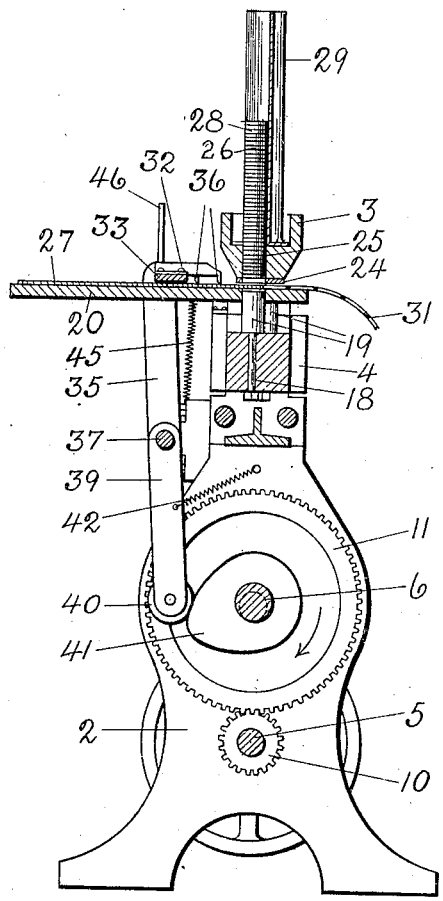
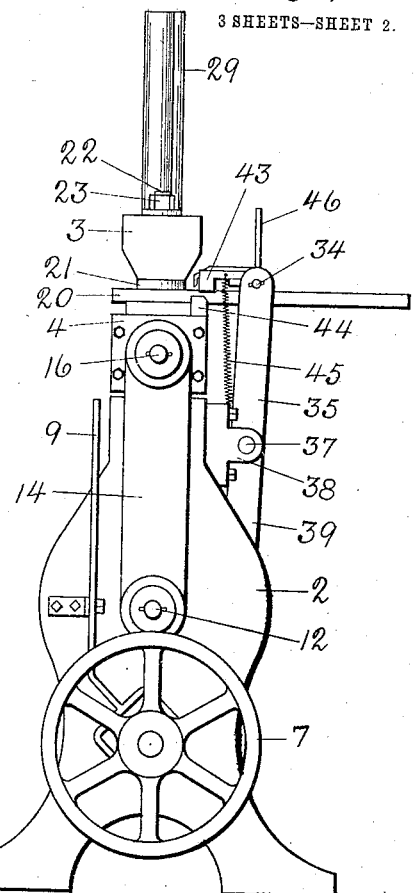
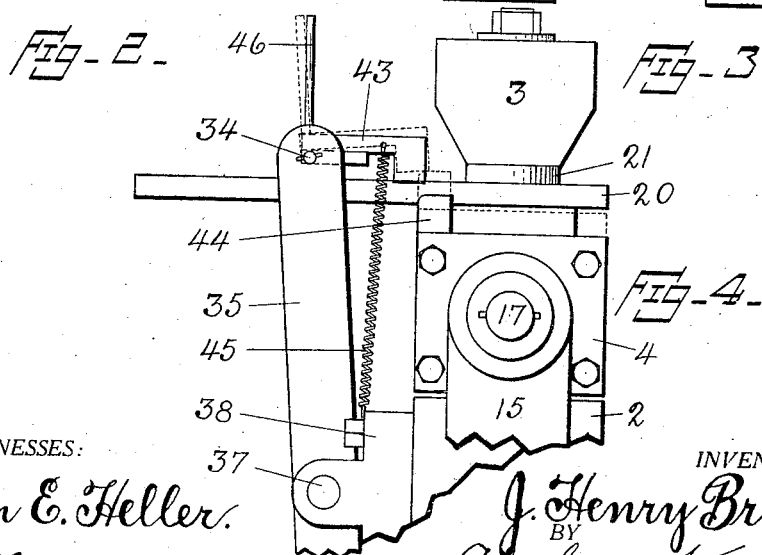
WITNESSES:
John E. Heller.
Mamie Norton
INVENTOR.
J. Henry Brady,
BY Abraham Knobel,
ATTORNEY.

J. H. BRADY.
CHEWING GUM CHIP FORMING MACHINE.
APPLICATION FILED JULY 26, 1909.
966,160.
Patented Aug. 2, 1910.
3 SHEETS—SHEET 3.
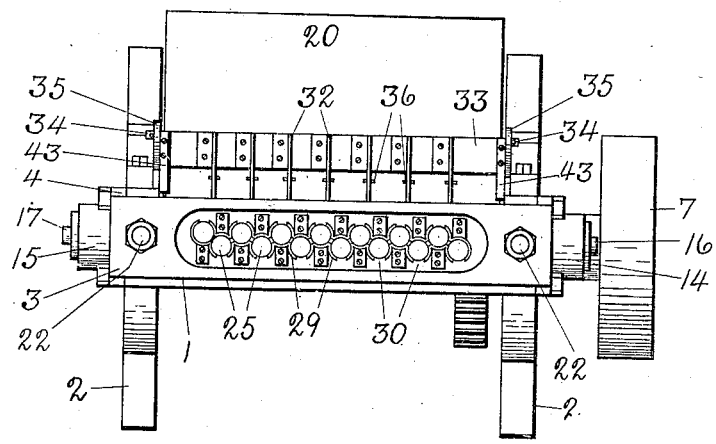
Fig-5-
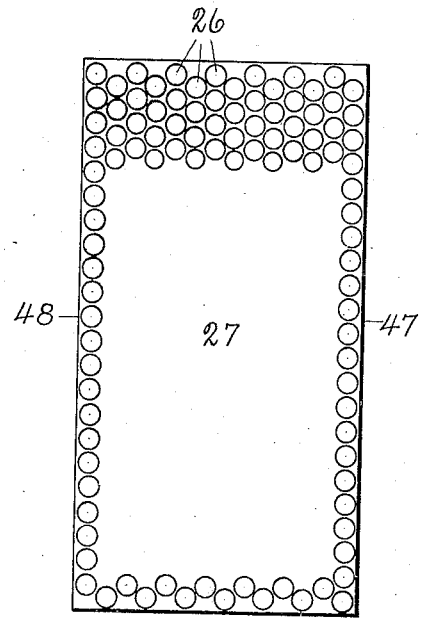
Fig-6-
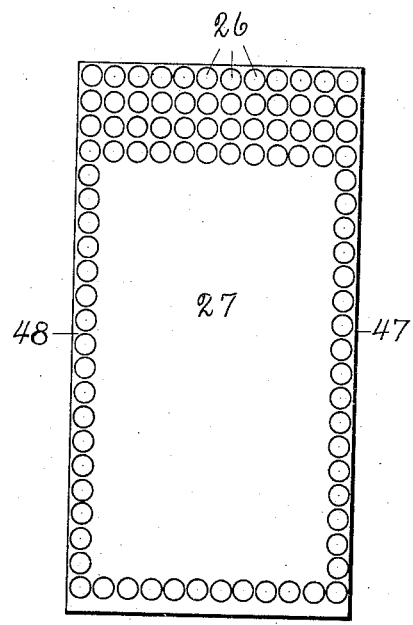
Fig-7-
WITNESSES:
John E. Heller.
Mamie Norton
INVENTOR.
J. Henry Brady,
BY Abraham Knobel,
ATTORNEY.

UNITED STATES PATENT OFFICE.

JAMES HENRY BRADY, OF LOUISVILLE, KENTUCKY, ASSIGNOR TO COLGAN GUM COMPANY, OF LOUISVILLE, KENTUCKY, A CORPORATION.

CHEWING-GUM-CHIP-FORMING MACHINE.

966,160.  Specification of Letters Patent.  Patented Aug. 2, 1910.

Application filed July 26, 1909. Serial No. 509,553.

*To all whom it may concern:*

Be it known that I, JAMES HENRY BRADY, a citizen of the United States, residing at Louisville, in the county of Jefferson and State of Kentucky, have invented a new and useful Chewing-Gum-Chip-Forming Machine, of which the following is a specification.

This invention relates to forming chips of chewing-gum so as to obtain the maximum number of chips from a given slab of gum; and thus to leave the minimum quantity of scrap; hence, saving in the labor of forming slabs, and uniformity of flavor and consistency of gum in the different batches and slabs; rapidity of production by each operative; and neatness and attractiveness of shape of the chips. In the accompanying drawings I have illustrated the preferable construction of the apparatus for carrying out my method and attaining these objects.

In these drawings,—Figure 1 is a front elevation; Fig. 2 is a vertical section; Fig. 3, a side elevation; Fig. 4, a fragmentary detail view, illustrating the feed mechanism; Fig. 5, a top plan view; Fig. 6, a diagrammatic view of the slab, showing the method of punching out the chips therefrom.

Similar reference numerals refer to similar parts throughout the several views of the drawings.

On account of the sticky and tenacious nature of chicle-gum, it has heretofore been thought to be impracticable to shear or punch it, in the manner in which metal and other substances are sheared and punched. But by experiment I have devised a method and apparatus by which I am enabled to do this very successfully. I have also devised a method of punching circular chips from slabs of chicle-chewing-gum of the proper thickness to form the chips in such a way that a minimum amount of scrap is left and a maximum number of chips is obtained from a slab of given size. The method of arranging the punchings in the slab is illustrated in Fig. 6, where it will be seen that the punchings are arranged in a zig-zag row across a long slab having parallel side edges. In Fig. 7, is shown, diagrammatically, the ordinary and obvious method of punching circular chips from a slab or sheet. It will be observed that there is an equal number of transverse rows of punchings in each of the Figs. 6 and 7; but in Fig. 6 there are 14 punchings in a transverse row, while in Fig. 7, there are but 12. There are, therefore, 308 punchings in the slab shown in Fig. 6, whereas, there are but 264 punchings in the slab shown in Fig. 7, showing a gain of 44 punchings for the new method. It was found that in the use of the method illustrated in Fig. 7, and using dies of the common wad-cutter type, there resulted 50 per cent. of scrap. It was found very difficult to work this scrap over, and impossible to make the chewing-gum of the same flavor, consistency, and quality in general, as was made from the original chicle. Very unsatisfactory results were obtained and considerable loss was entailed, both in labor and material; in fact so much as to be prohibitive or manufacture by the old method. The new method, however, produced so great a saving as to render the manufacture quite profitable.

It has been customary to make cakes of chewing-gum by scoring the slabs, by means of rollers provided with knives, curing the slabs thus scored, and breaking the cakes apart by hand. This was practicable, however, only with rectangular cakes. It was found that the circular chip of chewing-gum was more popular than other forms, and therefore it has been adopted. The difficulty heretofore has been that the manufacture in this circular form was too expensive.

My method of shearing or punching chips and my method of arranging the punchings in the slab in zig-zag relation has overcome the difficulty. The mechanism or apparatus by means of which I practice this method comprises a punching-press, 1, the main parts of which are legs, 2, a bolster, 3, a slide, 4, a driving shaft, 5, and a crank shaft, 6. The bolster, 3 is mounted rigidly on top of legs, 2, and slide 4 is slidably mounted upon guides formed upon the upper end of legs, 2 and underneath the bolster, 3. The driving-shaft, 5, is journaled in the legs 2, as is also the crank-shaft 6. Shaft 5 is provided with a driving-pulley, 7, and a clutch 8. The clutch is controlled by means of a handle, 9. Shaft 5 is provided with a pinion, 10. Upon shaft 6 is mounted a gear, 11, which meshes with the pinion 10. The ends of shaft 6 are provided with cranks, 12 and 13, and upon these are mounted connecting-rods, 14 and 15, which connect the cranks with pins, 16 and 17, extending from the ends of slide 4. By this means, slide 4 is vertically reciprocated. Slide 4 is preferably a solid transverse bar, which is pierced vertically with holes for bolts, 18. The upper surface of slide 4 is planed off, and upon it are set cylindrical punches, 19, which are drilled and tapped in their lower ends and thus adapted to receive and to be firmly held in place by bolts 18. The holes for bolts 18 in slide 4 are made slightly larger in diameter than the bolts, in order that there may be room for adjustment of punches 19, while setting them to enter the dies. Across the upper ends of legs 2 is secured a table, 20, to support a slab of gum that is being punched. Above the table 20 is placed the bolster 3, which is held at a suitable distance above the table, by collars, 21. The bolster 3 is mounted by means of studs, 22, which are secured in the upper end of legs 2 and provided with nuts, 23. On the under surface of the bolster 3 is secured a die-plate, 24, provided with perforations corresponding with punches 19. The bolster 3 is provided with vertical round holes, 25, corresponding in position with the holes in die-plate 24. By this means cakes of chewing-gum, 26, are punched from a slab, 27, through the die-plate 24 and as these accumulate they form columns, 28, which rise through the holes 25. Upon the upper surface of bolster 3 are secured vertical sheet-metal cages, 29, so as to support the columns 28 of chewing-gum. These cages are provided with vertical slots, 30, through which the fingers of the operatives may be inserted, in order to lift out the columns of cakes from the upper end of the cages. The table 20 is provided with holes, through which the punches 19 pass loosely, and thus the table serves at the same time as a stripper plate for the punches. The scrap is shown as it leaves the punches at 31. The slab 27 of chewing-gum is fed to the punches by reciprocating feed mechanism. This consists of a series of bars, 32, secured on a transverse bar, 33, which is mounted by means of trunnions, 34, in the upper end of crank-arms, 35. The bars 30 are provided on their lower edge with chisel-shaped pushers, 36, which are adapted to strike into the upper surface of the slab of chewing-gum 27 and push it forward to the punches. The crank-arms 35 are mounted on each end of a rock-shaft, 37, which is mounted in bearing-blocks, 38, secured on legs 2. Approximately at the middle of the shaft 37 is secured a crank-arm, 39, which is provided at its lower end with a cam-roller, 40. A cam, 41, is mounted upon crank-shaft 6. These parts are all so disposed and arranged that when slide 4 is descending, between the time that punches 19 leave slab 27 until they rise and come in contact with it again, cam 41 pushes roller 40 and causes the bars 32 to advance toward the punches and their pushers 36 to feed the slab 27 forward preparatory to the next punching operation. While punches 19 are passing through the slab and descending from it again, cam 41 allows roller 40 to be drawn toward shaft 6, through the instrumentality of a spring, 42, which is secured to crank-arm 39 and the frame of the machine, and thus permits the pushers 36 to recede from the punches and take a fresh hold in the surface of the slab. To permit the pushers to recede freely, lifting means are provided, by which the pushers are lifted out of engagement with the slab. These lifting means comprise feet, 43, which are secured to and extend from bar 33, and blocks, 44, on the upper surface near each end of slide 4. A tension-spring, 45, is secured at one of its ends to each foot 43 and at its opposite end to one of the boxes 38. By this means pushers 36 are drawn down into forcible engagement with slab 27.

A vertical rod, 46, is secured in bar 33, which serves as a handle, by means of which the operative may tilt the pushers 36 upward whenever it becomes necessary to remove any obstruction, or for other purposes. It will now be understood that when pushers 36 have advanced the slab to the forward limit of their movement feet 43 are in a position immediately above blocks 44, and as the blocks rest in this position until the punches take hold of the slab, blocks 44 engage the under surface of feet 43. As slide 4 advances upward feet 43, and consequently pushers 36, are lifted by blocks 44, so that the pushers are raised clear of slab 27. As the pushers and feet 43 now recede the feet slide upon the surface of blocks 44 and finally, at the end of their rearward movement, drop off the blocks, and thus the pushers 36 are struck firmly into the surface of the slab, through the instrumentality of spring 45.

The punches 19 are arranged upon slide 4 in a zig-zag row, and die-plate 24 has its perforations similarly arranged, so that the successive rows of punchings (Fig. 6) are so interlocked as to leave a minimum amount of material or scrap around the holes. By rolling the chewing-gum into slabs in such a manner that straight side edges, 47 and 48 (Fig. 6), are formed, a complete row of chips is obtained at each advance of the slab and each complete cycle of the punches and thus no cakes with imperfect edges are formed, which thereby require additional labor to sort out.

It will be understood that from the peculiar construction of this machine, it may be operated rapidly and great comparative increased production may be attained.

Having thus described my invention so that any one skilled in the art pertaining thereto may construct it and its use may be easily understood, I claim—

1. Apparatus for forming chips of chewing gum, comprising a frame, a bolster, a slide, means for actuating said slide, dies on said bolster and punches on said slide, a feed-table, feed-pushers mounted over said feed-table adapted to strike into the upper surface of a slab of chewing gum and push the slab to said punches and dies, and feet connected with said pushers whereby said pushers are raised out of engagement with the slab by said slide.

2. Apparatus of the class described, comprising a frame, a bolster on top of said frame, a slide underneath said bolster, a die mounted under said bolster, and a punch mounted upon said slide, said bolster being provided with an aperture for allowing chips of chewing gum to pass upward therethrough.

3. In apparatus for forming chips of chewing-gum, a punching-press; a bolster on the top of said punching-press, and a slide underneath said bolster; a die-plate secured on the under side of said bolster; and punches secured on the top of said slide.

4. In apparatus for forming chips of chewing-gum, a punching-press, comprising a bolster, a slide underneath said bolster, a row of dies on the under side of said bolster, said bolster provided with vertical holes corresponding with said dies and a vertical cage over each of said holes adapted to support columns of chips as they are punched upward through said dies.

JAMES HENRY BRADY.

Witnesses:
 WM. J. SAUER,
 ABRAHAM KNOBEL.